(12) United States Patent
Yu et al.

(10) Patent No.: US 8,219,166 B2
(45) Date of Patent: Jul. 10, 2012

(54) MANUFACTURING OF BACK LIGHTING STRUCTURE FOR MOBILE TERMINAL

(75) Inventors: Indong Yu, Seoul (KR); Heeseok Noh, Seoul (KR); Wonseok Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 1109 days.

(21) Appl. No.: 12/026,367

(22) Filed: Feb. 5, 2008

(65) Prior Publication Data
US 2008/0187716 A1 Aug. 7, 2008

(30) Foreign Application Priority Data

Feb. 6, 2007 (KR) .................. 10-2007-0012203

(51) Int. Cl.
*H04M 1/00* (2006.01)
*H04B 7/00* (2006.01)
(52) U.S. Cl. .......... 455/575.8; 455/90.3; 455/575.1; 455/550.1; 455/66.1; 455/347; 455/128
(58) Field of Classification Search .......... 455/550.1, 455/552.1, 556.1, 66.1, 66.7, 556.2, 128, 455/566, 344–346, 159.1–159.2, 575.8
See application file for complete search history.

(56) References Cited

U.S. PATENT DOCUMENTS

| 7,197,338 | B2* | 3/2007 | Ozawa ..................... 455/566 |
| 7,600,880 | B2* | 10/2009 | Cybart et al. ................ 362/24 |
| 2005/0253923 | A1* | 11/2005 | Komori et al. ............ 348/14.02 |
| 2005/0260386 | A1 | 11/2005 | Heinrich et al. |
| 2007/0297193 | A1* | 12/2007 | Ite et al. ..................... 362/615 |

FOREIGN PATENT DOCUMENTS

EP 0932288 A1 7/1999
* cited by examiner

*Primary Examiner* — Olumide T Ajibade Akonai
*Assistant Examiner* — Emem Stephen
(74) *Attorney, Agent, or Firm* — Birch, Stewart, Kolasch & Birch, LLP.

(57) ABSTRACT

There is provided a mobile terminal comprising a back lighting structure. The mobile terminal according to an embodiment comprises a light emitting device and a case part provided on the light emitting device and formed of a transmissive material. The mobile terminal further comprises a shielding coating layer laminated on a region excluding a specific region of the case part and formed of a shielding material so that the specific region of the case part transmits light.

24 Claims, 6 Drawing Sheets

MANUFACTURING OF BACK LIGHTING STRUCTURE FOR MOBILE TERMINAL

This nonprovisional application claims priority under 35 U.S.C. §119(a) on Patent Application No. 10-2007-0012203 filed in Republic of Korea on Feb. 6, 2007, the entire contents of which are hereby incorporated by reference.

BACKGROUND

1. Field

This document relates to manufacturing of a back lighting structure of a mobile terminal.

2. Discussion of Related Art

A conventional key pad for a mobile terminal passes light from a light emitting device to the outside only through font parts formed on letter/number buttons of the key pad.

SUMMARY

An aspect of this document is to provide a hack lighting structure of a mobile terminal and a method of manufacturing the same.

The present invention provides a mobile device and a method of forming a lighting structure for the mobile device, which address the limitations and disadvantages associated with the related art.

In an aspect, the present invention provides a mobile terminal comprising a back lighting structure which comprises a light emitting device, a case structure (or case part) provided on the light emitting device and formed of a transmissive material, and a first coating layer laminated on a region excluding a specific region of the case structure and formed of a material having a transmittance different from a transmittance of the case structure.

The mobile terminal may further comprise a protecting layer laminated on the first coating layer and formed of a transmissive material to protect the first coating layer.

According to an embodiment, the mobile terminal may further comprises first embossing coating layers laminated between the first coating layer and the protecting layer in a specific form and formed of a material having a different transmittance from a transmittance of the first coating layer.

In another aspect, the present invention provides a method of manufacturing a hack lighting structure of a mobile terminal comprises forming first embossing coating layers laminated on a rear surface of a protecting layer formed of a transmissive material in a specific form, and applying a coating material having a transmittance different from a transmittance of the first embossing coating layers on the rear surface of the protecting layer to form a second coating layer after forming the first embossing coating layers.

According to an embodiment, the method may further comprise applying a coating material having a transmittance different from the transmittances of the first embossing coating layers and the second coating layer on a region excluding a specific region of a rear surface of the second coating layer to form a first coating layer.

In still another aspect, the back lighting structure of the mobile terminal according to an embodiment of the present invention may be manufactured by one of the above-described methods of manufacturing the back lighting structure.

In still another aspect, the present invention provides a method of manufacturing a back lighting structure of a mobile terminal comprises forming first embossing coating layers laminated on a rear surface of a protecting layer in a specific region of which a through hole is formed and that is formed of a transmissive material in a specific form, and applying a coating layer having a transmittance different from a transmittance of the first embossing coating layers on the rear surface of the protecting layer to form a second coating layer after forming the first embossing coating layers.

According to an embodiment, the method may further comprises applying a coating material having a transmittance different from the transmittances of the first embossing coating layers and the second coating layer on the rear surface of the second coating layer to form a first coating layer.

According to another embodiment, a mobile terminal comprising a back lighting structure which comprises: at least one light emitting device; a case part formed of a light transmissive material and configured to receive light from the light emitting device; and a first coating layer over the case part, excluding a specific region on the case part, and formed of a material having a transmittance different from a transmittance of the case part.

According to another embodiment, a method of manufacturing a back lighting structure of a mobile terminal, the method comprising: forming first embossing coating layers over a surface of a protecting layer formed of a transmissive material; and applying a coating material having a transmittance different from a transmittance of the first embossing coating layers, over the surface of the protecting layer so as to form a second coating layer after forming the first embossing coating layers.

BRIEF DESCRIPTION OF THE DRAWINGS

The implementations of this document will be described in detail with reference to the following drawings in which like numerals refer to like elements.

DETAILED DESCRIPTION

Hereinafter, embodiments of the invention will be described in detail with reference to the attached drawings.

Embodiment 1

Figure 1:
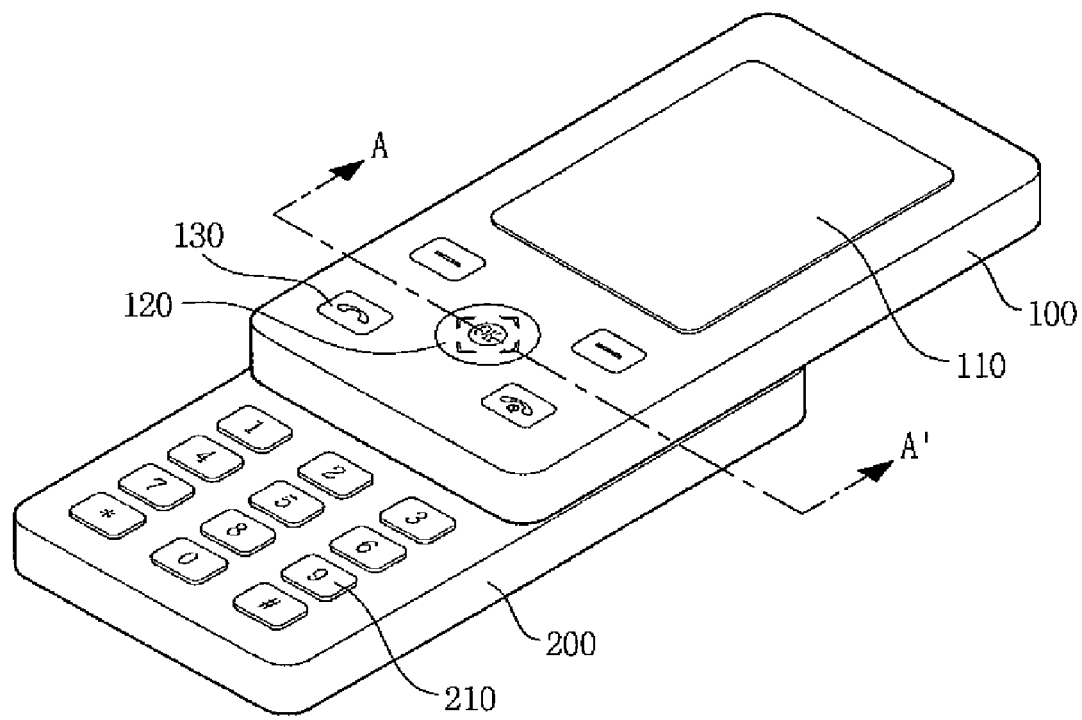
FIG. 1 is a perspective view of the mobile terminal of embodiment 1 according to the present invention.
Figure 2:
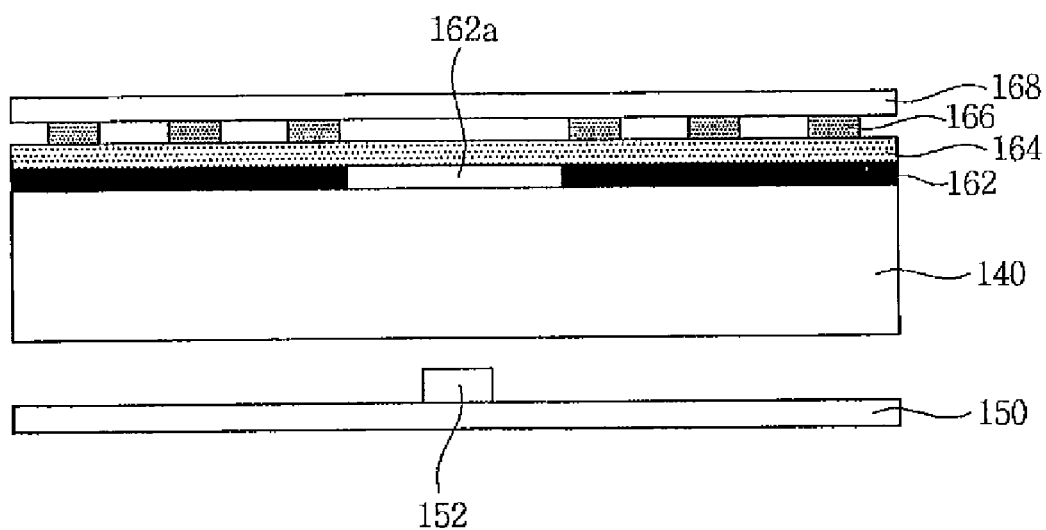
FIG. 2 is a sectional view taken along the line A-A' of FIG. 1.
Figure 3:
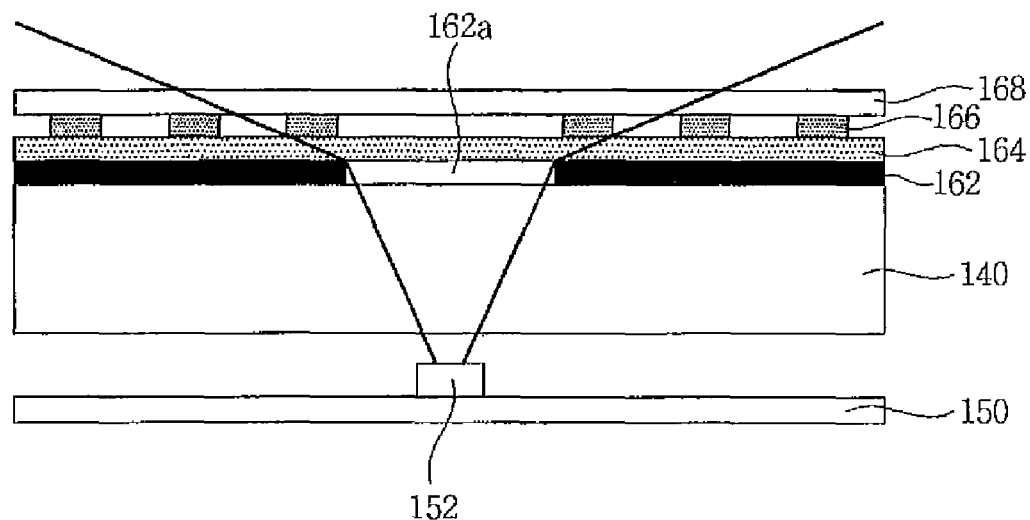
FIGS. 3 and 4 are respectively a sectional view and a front view illustrating the operation of the mobile terminal of the embodiment 1.
Figure 4:
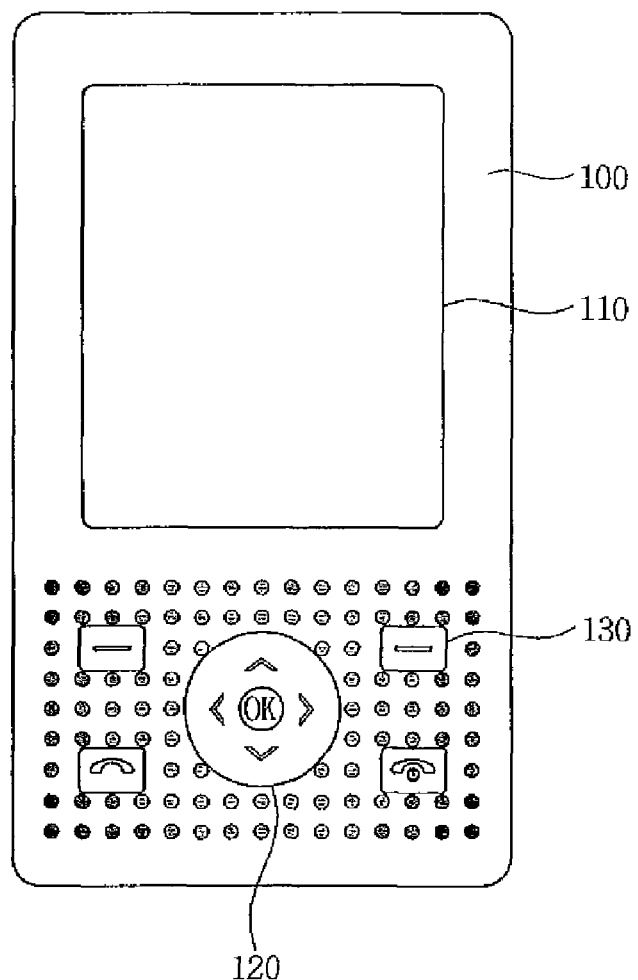

Embodiment 1 relates to a mobile terminal comprising a back lighting structure. FIG. 1 is a perspective view of an example of the mobile terminal of embodiment 1. FIG. 2 is a sectional view taken along the line A-A' of FIG. 1. FIGS. 3 and 4 are respectively a sectional view and a front view illustrating the operation of the mobile terminal of the embodiment 1.

Referring to FIG. 1, the mobile terminal according to the embodiment 1 comprises a first body 100 and a second body 200. The first body 100 is provided on the top surface of the second body 200 to slide on the second body 200 so that the second body 200 is opened (exposed) and closed (covered by the first body 100). The components of the mobile terminal that is discussed in this embodiment and in all other embodiments are operatively coupled and configured.

Referring to FIG. 1, the first body 100 comprises a displaying unit 110 and an inputting device. The inputting device comprises a circular multi key button 120 provided in the center or at some other location, and one or more touch pads 130 provided on the right and left sides of the multi key button 120 or at some other location. The multi key button 120 comprises a direction key button (e.g., four-direction key button) and an Internet connection key button (e.g., "OK" button). Although the multi key button 120 has a circular shape, the invention is not limited thereto and can include other shapes for the multi key button 120. The touch pads 130 is used to perform the functions of communication, end, search, and menu modes, but can be configured to perform other functions. The displaying unit 110 can be a touch screen, and can include one or more display panels.

Referring to FIG. 1, the second body 200 also comprises an inputting device and other known components. The inputting device of the second body 200 includes common character key buttons (or keypad) 210. The character key buttons 210 are exposed to the outside as the first body 100 slides.

Referring to FIG. 2, the first body 100 comprises a case structure 140. The case structure 140 is also referred to herein as a case part. The case structure 140 forms, at least in part, the external appearance of the first body 100. The case structure 140 is preferably molded by transparent acryl (or other suitable material) that transmits light.

Referring to FIG. 2, an auxiliary printed circuit board (PCB) 150 is provided in the case structure 140 or below the case structure 140. A light emitting device 152 is mounted on the auxiliary PCB 150. The light emitting device 152 is preferably a light emitting diode (LED) but can be other light source.

Referring to FIG. 2, a shielding coating layer 162 is laminated on the case structure 140. The shielding coating layer 162 is formed of a black coating material (or other light shielding material) to shield light. However, the shielding coating layer 162 is laminated on the region excluding a specific region 162a of the case structure 140 so that light passes through the specific region 162a of the case structure 140. The region in which the shielding coating layer 162 is not formed in the case structure 140 (that is, the specific region 162a of the case structure 140) is a region in which the multi key button 120 is formed and thus corresponds to the multi key button 120 in shape and/or size. For instance, the specific region 162a where the shielding coating layer 162 is not formed can be a circular region of the same size as the multi key button 120. In addition, referring to FIG. 1, a font (not denoted by a reference numeral) for informing a function selected when the multi key button 120 is clicked is formed in the region.

Referring to FIG. 2, a semi-transmissive coating layer 164 is laminated over the shielding coating layer 162 including the specific region 162a. The semi-transmissive coating layer 164 is preferably formed of a white coating material (or other semi-light transmitting material) that semi-transmits light. The semi-transmissive coating material transmits only a part of incident light and reflects or absorbs the remaining part of the incident light.

Referring to FIG. 2, first embossing coating layers 166 are laminated over the semi-transmissive coating layer 164. The first embossing coating layers 166 in the form of dots (or other pattern) are discretely laminated on the region, excluding the region 162a on which the shielding coating layer 162 is not formed. That is, the first embossing coating layers 166 are not formed in an area corresponding to the above-mentioned specific region 162a. The first embossing coating layers 166 are preferably formed of a gray semi-transmissive coating material.

Referring to FIG. 2, a protecting layer 168 is laminated over the first embossing coating layers 166. The protecting layer 168 is formed of a transmissive material such as a transparent film.

The mobile terminal according to the embodiment 1 also comprises a controller and other known components such as a speaker, etc. The controller can reside on the PCB 150. The controller controls the circular specific region in which the shielding coating layer 162 is not formed in the case structure 140 to function as the multi key button that is the inputting device. For example, a metal dome switch (not shown FIG. 2) is provided under the circular specific region of the case structure 140 on the auxiliary PCB 150. When the circular specific region (i.e., the button 120) of the case structure 140 is pressed by an external touch, the rear surface of the circular specific region operates the metal dome switch which in turn triggers a function selected by the button 120 to be performed. In addition, the controller controls the touch pads 130 of the first body 100 and the character key button 210 of the second body to function as inputting devices.

In addition, the controller controls the light emitting device 152 to emit light for a predetermined time as the first body 100 slides on the second body 200 to open or expose the second body 200. For instance, the controller can detect the sliding action of the first body 100 or the end of the sliding action of the first body 100, and then control the light emitting device 152 to emit light based on the sliding action detection so that the button 120 and its surrounding areas are illuminated when the second body 200 is exposed. In addition, the controller controls the light emitting device 152 to emit light for a predetermined time as the multi key button 120 and/or the touch pads 130 of the first body 100 and/or the character key buttons 210 of the second body 200 operate.

Hereinafter, the operation of the embodiment 1 according to the invention will be described.

Referring to FIGS. 1 and 2, the first body 100 slides on the second body 200 so that the character key buttons 210 of the second body 200 are exposed to the outside.

Referring to FIG. 3, as the first body 100 is opened (i.e., as the keys on the second body 120 are exposed), the controller of the mobile terminal controls the light emitting device 152 to emit light for a predetermined time. The light emitted by the light emitting device 152 is incident on the case structure 140.

Referring to FIG. 3, since the shielding coating layer 162 is laminated on the case structure 140 and the shielding coating layer 162 prevents light from being transmitted, the light is output to the outside through only the specific region 162a on which the shielding coating layer 162 is not laminated over the case structure 140, that is, the part corresponding to the multi key button 120.

Referring to FIG. 3, the light that passes through the specific region 162a in the case structure 140 is incident on the semi-transmissive coating layer 164. The semi-transmissive coating layer 164 formed of a white coating material transmits only a part of the light and reflects or absorbs the remaining part of the light. Therefore, the amount of the light that is transmitted through the semi-transmissive coating layer 164 is slightly reduced as you move away from the center area corresponding to the top surface of the specific region of the case structure 140.

Referring to FIG. 3, a part of the light that passes through the semi-transmissive coating layer 164 passes through the first embossing coating layers 166 and is incident on the protecting layer 168, whereas the remaining part of the light that passes through the semi-transmissive coating layer 164 from the specific region 162a does not pass through the first embossing coating layers 166 but is directly incident on the protecting layer 168. Since the first embossing coating layers 166 are formed of the gray semi-transmissive coating material, a part of the light incident on the first embossing coating layers 166 are reflected or absorbed.

Therefore, under the same conditions, the amount of light that passes through the first embossing coating layers 166 to be incident on the protecting layer 168 is smaller than the amount of light that does not pass through the first embossing coating layers 166 but is directly incident on the protecting layer 168 through the specific region 162a. On the other hand, the first embossing coating layers 166 are discretely formed in the form of dots and the protecting layer 168 is formed of transparent acryl resin that transmits light. Therefore, as illustrated in FIG. 4, a plurality of dots are discretely distributed and illuminated on the surface of the first body 100 in accordance with the intensity of light that passes through the protecting layer 168. That is, the circular part corresponding to the multi key button 120 (e.g., the center of the protecting layer 168) is brightly illuminated by the light from the light emitting device 152, and the top surface of the first embossing coating layers 166 are in the form of gray dots based on the circular part. In addition, since the first embossing coating layers 166 are laminated under the protecting layer 168, it appears that the gray dots are formed under the protecting layer 168 so that the gray dots look three dimensional. On the other hand, the protecting layer 168 becomes gradually darker as you move away from the center area where the button 120 is located due to the shielding coating layer 162 and the semi-transmissive coating layer 164.

On the other hand, when the multi key button 120, the touch pads 130, and/or the character key buttons 210 operate in a state where the first body 100 is opened to expose the second body 200, the controller controls the light emitting device 152 to emit light for a predetermined time so that the surface of the protecting layer 168 is in the above-described form.

In the case of the embodiment 1, the semi-transmissive coating layer 164 is formed in an area above the circular specific region 162a in which the shielding coating layer 162 is not formed on the case structure 140. However, in other embodiments, the semi-transmissive coating layer 164 may not be formed in an area above the specific region 162a. That is, the semi-transmissive coating layer 164 may also have a specific region in which the coating layer 164 is not formed, similar to the specific region 162a.

In the embodiment 1, the semi-transmissive coating layer 164 is not formed between the adjacent first embossing coating layers 166. For instance, there is no semi-transmissive coating layer 164 that is formed in the gaps between the adjacent embossing coating layers 166. However, in other embodiments, such semi-transmissive coating layer 164 may be formed. At this time, the transmittance of the semi-transmissive coating layer 164 is larger than the transmittance of the first embossing coating layers 166.

In the embodiment 1, the first embossing coating layers 166 is formed of a semi-transmissive coating material similar to the semi-transmissive coating layer 164. However, in other embodiments, the first embossing coating layers 166 may be formed of shielding coating layers formed of a light shielding material.

In the embodiment 1, the first embossing coating layers 166 are in the form of dots. However, in other embodiments, the first embossing coating layers 166 may be in other specific forms such as famous characters and/or natural objects.

in the embodiment 1 the mobile terminal is a sliding mobile terminal in which the first body 100 slides on the second body 200. However, the mobile terminal can be of other type such as a bar type mobile terminal or a folder type mobile terminal. Similarly, in other embodiments, the mobile terminal may be a sliding type mobile terminal, a bar type mobile terminal formed of only the first body 100, etc.

Therefore, as the first body slides to be opened and/or the input device is operated, the light emitting device emits light for a predetermined time so that the circular multi key button is illuminated brightly and that it becomes gradually darker away from the circular multi Key button. As a result, when the mobile terminal is used, the illuminated multi key button and other illuminated areas function to invite a user to operate the multi key button more easily, and at the same time, the external appearance of the mobile terminal is enhanced and beautified. Also, such visual effects will increase the use of the mobile terminal.

In addition, since the first embossing coating layers 166 are provided, the plurality of gray dots are discretely formed (or shown) on the top surface of the first body 100 when the light emitting device emits light. In particular, since the first embossing coating layers 166 are laminated under the protecting layer 168, it seems that the gray dots are formed under the protecting layer 168 so that the gray dots as shown look three dimensional.

Embodiment 2

Figure 5:
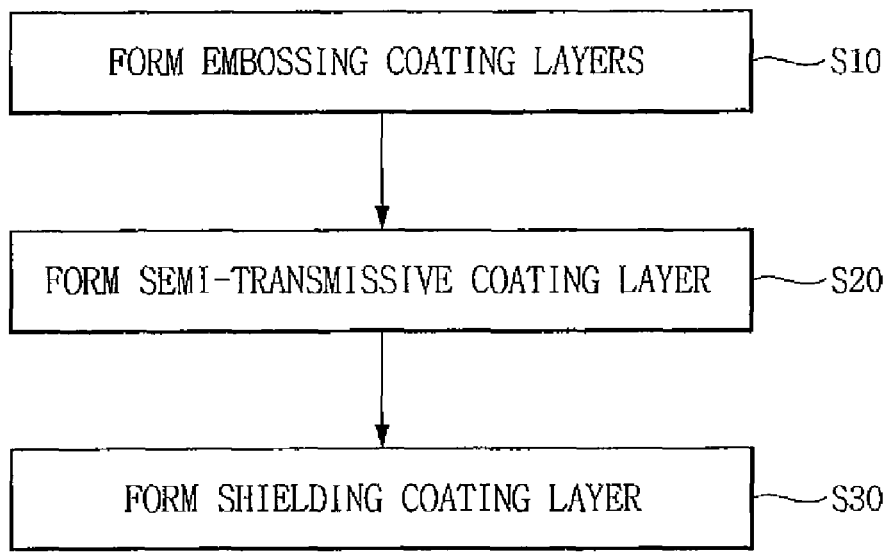
FIG. 5 is a flowchart of a method of manufacturing a back lighting structure of embodiment 2 according to the present invention.
Figure 6:
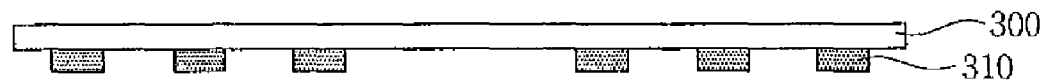
FIGS. 6 and 7 are sectional views illustrating the processes of the method of manufacturing the back lighting structure of the embodiment 2.
Figure 7:
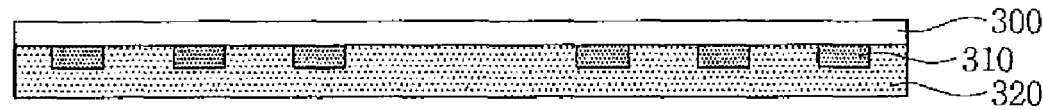
Figure 8:
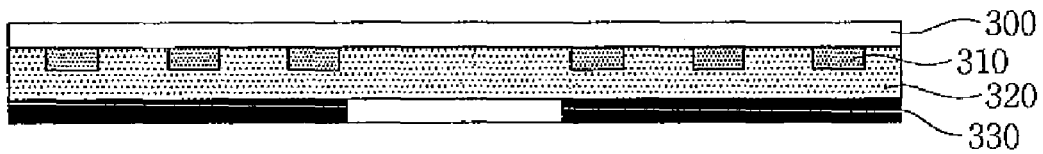
FIG. 8 is a sectional view for explaining a method of manufacturing a back lighting structure of embodiment 3 according to the present invention.

Embodiment 2 relates to a method of manufacturing a back lighting structure. FIG. 5 is a flowchart of a method of manufacturing a back lighting structure of embodiment 2. FIGS. 6 and 7 are sectional views illustrating the processes of the method of manufacturing the back lighting structure of the embodiment 2. FIG. 8 is a sectional view of a method of manufacturing a back lighting structure of embodiment 3. The back lighting structure fabricated by any of these methods can be used in a mobile device such as the mobile terminal of FIG. 1.

Referring to FIG. 5, the method of manufacturing a back lighting structure according to the embodiment 2 comprises a process of forming first embossing coating layers (S10), a process of forming a semi-transmissive coating layer (S20), and a process of forming a shielding coating layer (S30).

Referring to FIG. 6, in the process of forming the first embossing coating layers (S10), first embossing coating layers 310 are formed on the rear surface of a protecting layer 300. Here, the protecting layer 300 is a transparent film that transmits light. More specifically, a gray semi-transmissive coating material is discretely applied on the protective layer 300 excluding a specific region on the rear surface of the protecting layer 300, in the form of dots in an ultraviolet (UV) printing method to obtain the first embossing coating layers 310. The specific region here corresponds to an area where the multi key button (e.g., key button 120 described in the embodiment 1) is located and is circular in shape. For instance, the embossing coating layers 310 are formed in a dot matrix configuration on an area where the touch pads 130 and the multi key button 120 is formed on the first body 100, excluding an area where the multi key button 120 is formed as shown in, e.g., FIG. 4.

The UV printing method is the same as a common offset printing method. However, UV exclusive ink, printing board, and roller are used. The UV printing method is different from a drying method in a common printing method. In the drying method of the common printing method, heat is used and spray powders for preventing set-off from being generated are used.

Meanwhile, in the UV printing method, instantaneous hardening is performed by an optical energy drying method using a UV lamp for a time less than one second. Therefore, in the UV printing method, post-processing can be performed immediately after performing the printing by the drying method of the instantaneous hardening, the durability of the coating of a printed material is stronger than in the common printing method, and printing can be performed on plastic, a film, and metal as well as paper.

Referring to FIG. 7, in the process of forming the semi-transmissive coating layer (S20), a semi-transmissive coating layer 320 is formed. More specifically, a semi-transmissive coating material is printed on the rear surface of the protecting layer 300 on which the first embossing coating layers 310 are formed so as to obtain the semi-transmissive coating layer 320. The semi-transmissive coating layer 320 is formed of a white coating material having a higher transmittance than the transmittance of the coating material of the first embossing coating layer 310.

Referring to FIG. 8, in the process of forming the shielding coating layer (S30), a shielding coating layer 330 is formed. More specifically, a light shielding coating material is printed on the region excluding a specific region of the semi-transmissive coating layer 320 to obtain the shielding coating layer 330. The specific region on which the light shielding coating material is not applied is positioned under the specific region of the rear surface of the protecting layer 300. For instance, the shielding coating layer 300 includes a specific region which is the same as the specific region 162a as shown in FIG. 2. The shape and size of the specific region on which the light shielding coating material is not applied are the same as the shape and size of the specific region of the rear surface of the protecting layer 300. On the other hand, the light shielding coating material is, for example, black to prevent light from being transmitted.

In the embodiment 2, the gray coating material, the white coating material, and the black coating material are sequentially printed on the transparent film (the protecting layer 300) to easily manufacture the back lighting structure of the mobile terminal. Further, the semi-transmissive coating layer 320 is formed over and between the embossing coating layers 310.

The back lighting structure of the mobile terminal manufactured by the embodiment 2 is attached to the transparent acryl case structure/part of the mobile terminal so that it is possible to easily manufacture the mobile terminal having the area illuminated as shown in FIG. 4.

In addition, a simple printing work is performed on the transparent film that forms the protecting layer so that it is possible to rapidly and cost-effectively manufacture the back lighting structure of the mobile terminal in the present invention.

Embodiment 3

Embodiment 3 relates to the back lighting structure of the mobile terminal manufactured by the embodiment 2. Referring to FIG. 8 again, the back lighting structure according to the embodiment 3 comprises the protecting layer 300, the first embossing coating layers 310, the semi-transmissive coating layer 320, and the shielding coating layer 330. Since the description of modifications of the above has been made above in discussing the embodiment 2, the description thereof will be omitted.

Embodiment 4

Figure 9:
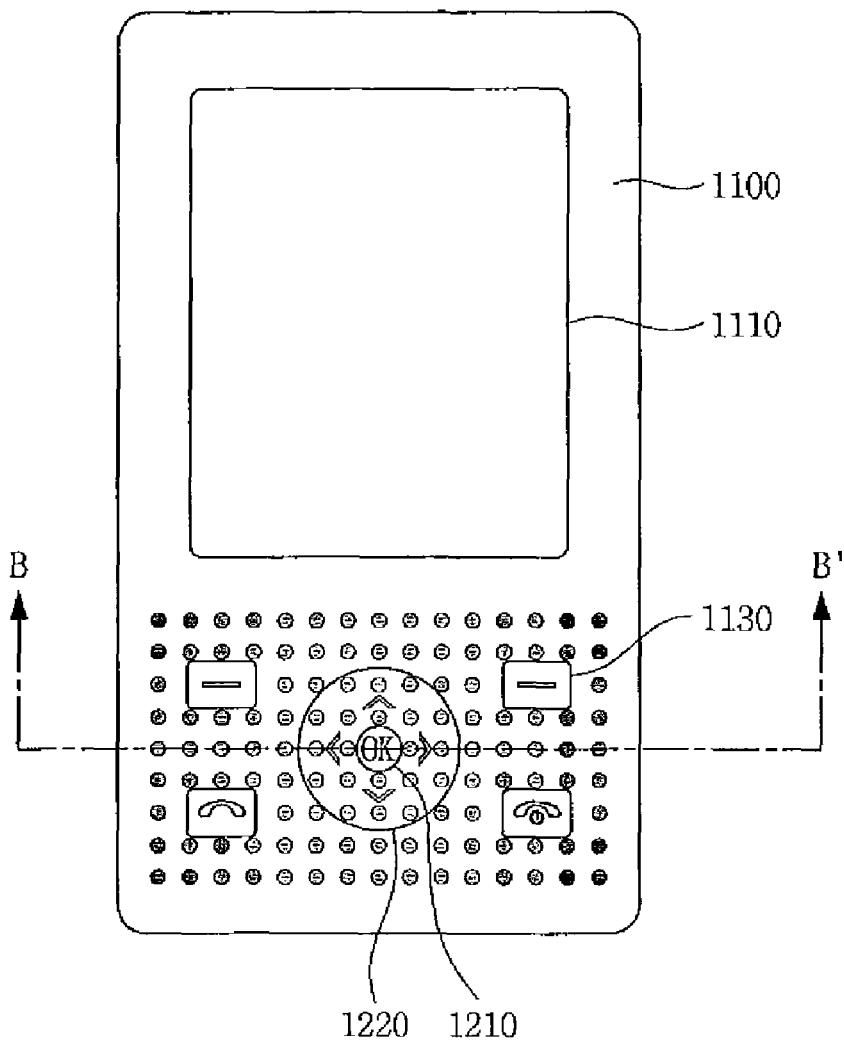
FIG. 9 is a plan view of a first body of a mobile terminal of embodiment 4 according to the present invention.
Figure 10:
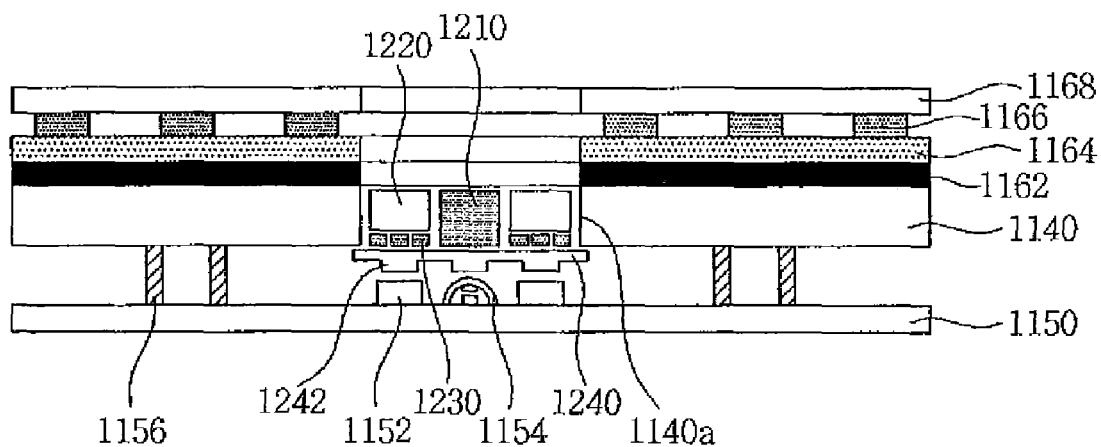
FIG. 10 is a sectional view taken along the line B-B' of FIG. 9.
Figure 11:
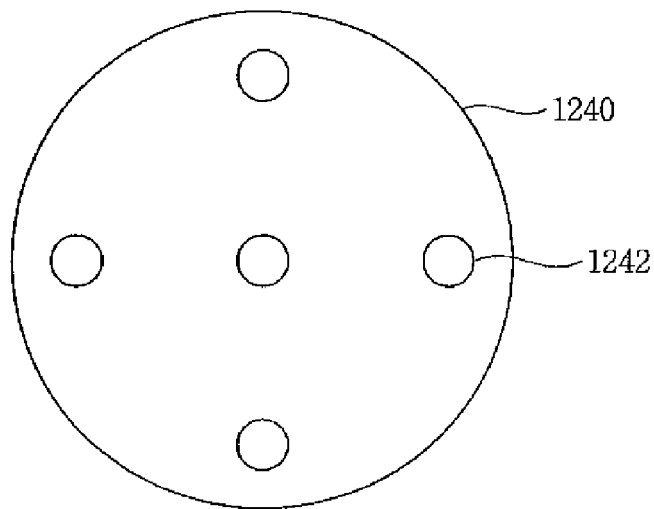
FIG. 11 is a rear view of a key button supporting unit of the mobile terminal of the embodiment 4.

Embodiment 4 illustrates an example of a mobile terminal comprising a back lighting structure. FIG. 9 is a plan view of a first body of a mobile terminal of embodiment 4. FIG. 10 is a sectional view taken along the line B-B' of FIG. 9. FIG. 11 is a rear view of a key button supporting unit of the mobile terminal of the embodiment 4.

Referring to FIG. 9, the mobile terminal according to the embodiment 4 comprises a first body 1100 and a second body. The first body 1100 is provided on the second body to slide on the second body and to open and close the second body, similar to the sliding type mobile terminal shown in FIG. 1. However, the mobile terminal according to the embodiment 4 can be a bar type mobile terminal having only one body which includes the first body 1100.

Referring to FIG. 9, the first body 1100 comprises a displaying unit 1110 and an inputting device. The inputting device comprises a first key button 1210, a second key button 1220, and touch pads 1130. The first key button 1210 may be an Internet connection key button and the second key button 1220 may be a direction key button such as a multi key button. The touch pads 1130 are touched by a user to perform the functions of communication, end, menu, and search modes and any other functions according to the configuration.

Referring to FIG. 10, the first body 1100 comprises a case structure 1140. A through hole 1140a is formed in the case structure 1140 through top and bottom. The case structure 1140 can be molded by, e.g., transparent acryl, which is a transmissive material like in the embodiment 1.

Referring to FIG. 10, a key button part is inserted into the through hole 1140a of the case structure 1140. The key button part comprises a first key button 1210 and a second key button 1220. The first key button 1210 is provided in the center of the through hole 1140a and the second key button 1220 is provided to surround the circumference of the first key button 1210. That is, the second key button 1220 is in the form of a donut, as an example only, and can be in other shape, such as a diamond.

Referring to FIG. 10, the first key button 1210 and the second key button 1220 are molded by a transmissive material (e.g., transparent acryl) like the case structure 1140. The second key button 1220 is manufactured to have a higher transmittance than the first key button 1210.

Referring to FIG. 10, second embossing coating layers 1230 are formed under the second key button 1220. The second embossing coating layers 1230 are formed of a gray coating material having a transmittance different from the transmittance of the second key button 1220. On the other hand, the second embossing coating layers 1230 are discretely laminated under the second key button 1220 in the form of dots or some other pattern.

Referring to FIG. 10, the first key button 1210 and the second key button 1220 are attached to and supported by a key button supporting unit 1240. The key button supporting unit 1240 is formed of a material having a high transmittance. Pressing protrusions 1242 protrude under the key button supporting unit 1240. Referring to FIG. 11 showing an example of the key button supporting unit 1240, one pressing protrusion 1242 is formed in the center of the key button supporting unit 1240 and four cylindrical pressing protrusions 1242 are formed by the same distance. The pressing protrusion 1242 formed in the center is formed in the position corresponding to the first key button 1210, and the cylindrical pressing protrusions 1242 are formed in the position corresponding to the second key button 1220.

Referring to FIG. 10, an auxiliary printed circuit board (PCB) 1150 is provided as part of or below the case structure 1140. Light emitting devices 1152 and dome switches 1154 are mounted on the auxiliary PCB 1150. The dome switches 1154 are positioned under the pressing protrusions 1242 to be pressed by the pressing protrusions 1242 and to operate when the pressing protrusions 1242 move downwardly. As an example, the four light emitting devices 1152 are provided under the second key button 1220 along the circumference by the same distance. The light emitting devices 1152 are provided between the adjacent dome switches 1154. The light emitting devices 1152 are preferably light emitting diodes (LED) but may be other types of light source.

Referring to FIG. 10, a shielding coating layer 1162 is laminated over the case structure 1140, excluding an area above the hole 1140a. The shielding coating layer 1162 is formed of a black coating material that shields light like in the embodiment 1.

Referring to FIG. 10, a semi-transmissive coating layer 1164 is laminated over the shielding coating layer 1162, excluding an area above the hole 1140a. The semi-transmissive coating layer 1164 is formed of a white coating material that semi-transmits light. The semi-transmissive coating material transmits only a part of incident light and reflects or absorbs the remaining part of the incident light.

Referring to FIG. 10, first embossing coating layers 1166 are laminated over the semi-transmissive coating layer 1164, excluding an area above the hole 1140a. The first embossing coating layers 1166 are discretely laminated in the form of dots or some other pattern. The first embossing coating layers 1166 are formed of a gray semi-transmissive coating material.

Referring to FIG. 10, a protecting layer 1168 is laminated over the first embossing coating layers 1166. The protecting layer 1168 is a transparent film that transmits light. In this example, the protective layer 1168 can be formed over the first embossing coating layers 1166, which can include an area above the hole 1140a or which can exclude the area above the hole 1140a. Further, the backlight structure of FIG. 2 or FIG. 8 may also be used in this embodiment having the second embossing coating layers 1230 below certain keys.

The mobile terminal according to the embodiment 4 (or any other embodiment discussed in this document) comprises a controller. The controller can reside on PCB 1150 or can be located elsewhere. The controller controls the mobile terminal to have a predetermined function in accordance with an input signal generated by the operation of the dome switches 1154. In addition, the controller controls the mobile terminal to perform the functions of the communication, end, search, and menu modes as the touch pads 1130 of the first body 100 are touched. On the other hand, a donut-shaped protecting pad 1156 is provided on the auxiliary PCB 1150 so that minute static electricity distribution caused when the touch pads 1130 are touched is maintained for a predetermined time. The protecting pad 1156 can also in other shape or configuration.

In addition, the controller controls the light emitting devices 1152 to emit light for a predetermined time as the first body 1100 slides on the second body to be opened. In addition, the controller controls the light emitting devices 1152 to emit light for a predetermined time as the first key button 1210, the second key button 1220, or the touch pads 1130 of the first body 1100 or character key buttons (e.g., similar to the buttons 210 in FIG. 1) of the second body are operated/selected.

Hereinafter, the operation of the mobile terminal according to the embodiment 4 will be described.

The operation of the mobile terminal according to the embodiment 4 is the same as the operation of the mobile terminal according to the embodiment 1. However, the embodiment 4 is different from the embodiment 1 in that the transmittance of the first key button 1210 is smaller than the transmittance of the second key button 1220 and that the second embossing coating layers 1230 are formed under the second key button 1220. Therefore, the second key button 1220 looks three dimensional due to the gray dots laminated under the second key button 1220.

Since the description of other items and modifications have been made above in connection with the embodiment 1, the description thereof for the embodiment 4 will be omitted.

Embodiment 5

Figure 12:
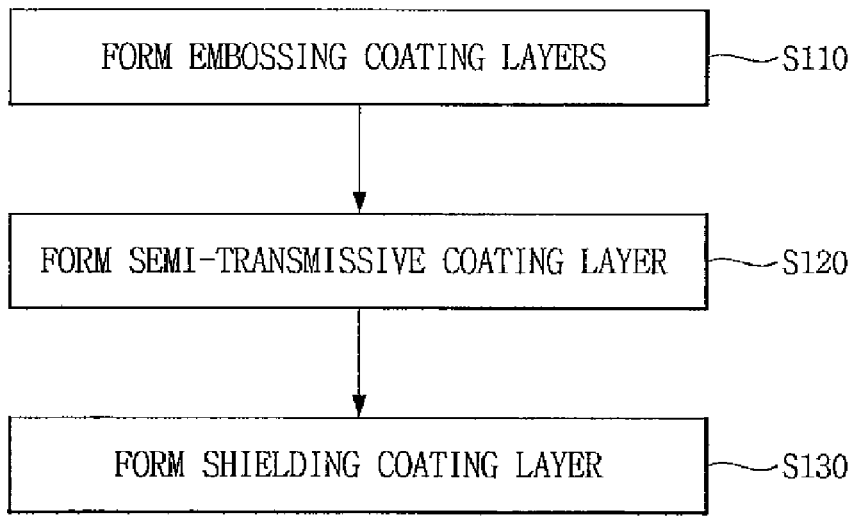
FIG. 12 is a flowchart of a method of manufacturing a back lighting structure of embodiment 5 according to the present invention.
Figure 13:
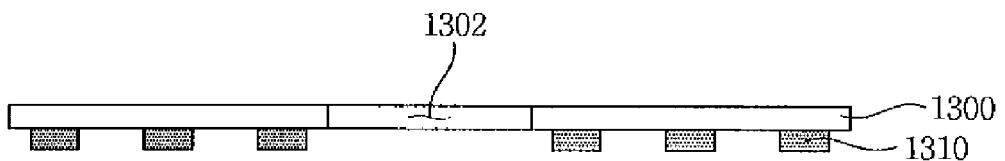
FIGS. 13 to 15 are sectional views illustrating the processes of the method of manufacturing the back lighting structure of the embodiment 5.
Figure 14:
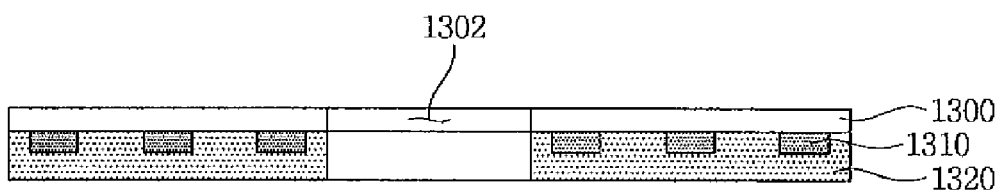
Figure 15:
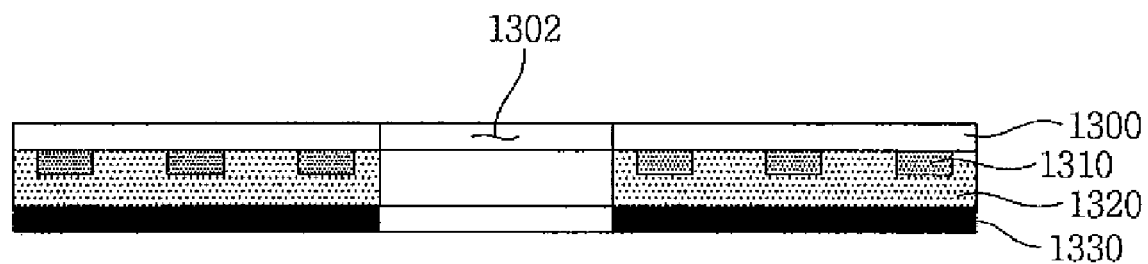

Embodiment 5 relates to a method of manufacturing a back lighting structure. FIG. 12 is a flowchart of a method of manufacturing a back lighting structure of the embodiment 5. FIG. 13 is a sectional view illustrating processes of forming first embossing coating layers of the embodiment 5. FIG. 14 is a sectional view illustrating processes of forming a semi-transmissive coating layer of the embodiment 5. FIG. 15 is a sectional view illustrating processes of forming a shielding coating layer of the embodiment 5. This method is used to form a back lighting structure of a mobile terminal.

Referring to FIG. 12, the method of manufacturing the back lighting structure comprises a process of forming first embossing coating layers (S110), a process of forming a semi-transmissive coating layer (S120), and a process of forming a shielding coating layer (S130).

Referring to FIG. 13, in the process of forming the first embossing coating layers (S110), the first embossing coating layers 1310 are laminated on the rear surface of the protecting layer 1300. More specifically, the first embossing coating layers 1310 are discretely applied to a protective layer 1300 in a specific form, e.g., in the form of dots. On the other hand, a circular through hole 1302 is formed in a specific region of the protecting layer 1300. That is, this specific region corresponds to the location of a key button such as the key button 120 or 1220. Therefore, the first embossing coating layers 1310 are laminated over the region excluding the through hole 1302. The protecting layer 1300 is a transparent film that transmits light. A gray semi-transmissive coating material is applied by an ultraviolet (UV) printing method to form the first embossing coating layers 1310.

Referring to FIG. 14, in the process of forming the semi-transmissive coating layer (S120), a semi-transmissive coating layer 1320 is formed. More specifically, a semi-transmissive coating material is printed on the rear surface of the protecting layer 1300 on which the first embossing coating layers 1310 are formed to obtain the semi-transmissive coating layer 1320. The semi-transmissive coating layer 1320 is formed of a white coating material having a higher transmittance than the transmittance of the coating material of the first embossing coating layers 1310. The semi-transmissive coating layer 1320 is not formed in an area below the through hole 1302. The semi-transmissive coating layer 1320 can be formed over and between the first embossing coating layers 1310.

Referring to FIG. 15, in the process of forming a shielding coating layer (S130), a shielding coating layer 1330 is formed. A block shielding coating material is printed on the rear surface of the protecting layer 1300 on which the semi-transmissive coating layer 1320 is formed, excluding the through hole 1302 area. The black shielding coating material that forms the shielding coating layer 1330 prevents light from being transmitted.

The back lighting structure of the mobile terminal manufactured by the embodiment 5 is attached to the transparent acryl case structure/part of the mobile terminal.

In the embodiment 5, the first embossing coating layers are discretely applied in the form of dots. However, the invention is not limited to, and the first embossing coating layers in the embodiments 1-6 may be in other form, such as in the form of famous characters or natural objects.

Embodiment 6

Embodiment 6 relates to the back lighting structure of the mobile terminal manufactured by the embodiment 5. Referring to FIG. 15, the back lighting structure according to the embodiment 6 comprises the protecting layer 1300, the first embossing coating layers 1310, the semi-transmissive coating layer 1320, and the shielding coating layer 1330. Since the description of modifications of the above has been made in connection with the embodiment 5, the description thereof will be omitted.

The mobile terminals discussed herein can be any mobile device which includes, but is not limited to, a cellular phone, a smart device, a computer notebook, a PDA, etc.

According to the various embodiment of the invention, it is possible to provide the back lighting structure of a mobile terminal that is easily manufactured and whose external appearance is beautified and the use is enhanced and to provide the method of manufacturing the same.

The preferred embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mobile terminal comprising a back lighting structure for a key button, the back lighting structure comprising:
    at least one light emitting device, as a first layer, and configured to illuminate the key button;
    a case part formed of a light transmissive material, as a second layer, and configured to receive light from the light emitting device;
    a first coating layer, as a third layer, over the case part, excluding a specific region on the case part, and formed of a material having a transmittance different from a transmittance of the case part; and
    a first embossing coating layer, as a fourth layer, over the first coating layer and including at least one semi-transmissive material having a transmittance different from the transmittance of the first coating layer, scattered discretely and excluding a location of the key button,
    wherein the first, second, third and fourth layers are laminated in a series.

2. The mobile terminal of claim 1, wherein the back lighting structure further comprises:
    a protecting layer formed of a light transmissive material laminated over the first embossing coating layer to protect the first embossing coating layer.

3. The mobile terminal of claim 2, wherein the protective layer includes a through hole disposed above the specific region.

4. The mobile terminal of claim 2, wherein the back lighting structure further comprises:
    a second coating layer provided between the first coating layer and the first embossing coating layer, and
    wherein the second coating layer is formed of a material having a transmittance different from the transmittances of the material of the first coating layer and the at least one semi-transmissive material of the first embossing coating layer.

5. The mobile terminal of claim 4, wherein the second coating layer is formed over the first embossing coating layer.

6. The mobile terminal of claim 4,
    wherein the material of the first coating layer is a shielding material, and
    wherein the material of the second coating layer is a semi-transmissive material.

7. The mobile terminal of claim 6,
    wherein the case part is formed by molding the light transmissive material, and
    wherein the protecting layer is formed of a transparent film.

8. The mobile terminal of claim 1, wherein the first embossing coating layer is discretely laminated in the forms of dots.

9. The mobile terminal of claim 1, wherein the light from the at least one light emitting device is shielded by the first coating layer while being transmitted through the specific region, and at least one selectable item is disposed below the specific region to function as a first inputting device.

10. The mobile terminal of claim 9, further comprising:
    a second inputting device,
    wherein the light emitting device emits light for a predetermined time in accordance with an operation of the first inputting device or the second inputting device.

11. The mobile terminal of claim 1, wherein the case part comprises:
    a through hole formed below the specific region, for receiving the key button inserted therein.

12. The mobile terminal of claim 11, wherein the key button comprises:
    a first key button, and
    at least one second key button that surrounds a circumference of the first key button.

13. The mobile terminal of claim 12, wherein the first key button and the at least one second key button are formed of at least one transmissive material.

14. The mobile terminal of claim 12, wherein the back lighting structure further comprises:
    second embossing coating layers discretely laminated under the at least one second key button and formed of a material having a transmittance different from a transmittance of the at least one second key button.

15. The mobile terminal of claim 14, wherein the first key button is molded by a transparent material, and
    the second embossing coating layers are formed of a gray coating material.

16. A method of manufacturing a back lighting structure for a key button of a mobile terminal, the method comprising:
forming first embossing coating layers over a surface of a protecting layer formed of a transmissive material; and
applying a second coating material over the surface of the protecting layer so as to form a second coating layer after forming the first embossing coating layers,
wherein the first embossing coating layers include at least one semi-transmissive material having a transmittance different from a transmittance of the second coating material, the at least one semi-transmissive material scattered discretely and excluding a location of the key button.

17. The method of claim 16, further comprising:
applying a first coating material, having a transmittance different from the transmittances of the at least one semi-transmissive material of the first embossing coating layers and second coating material of the second coating layer, over the second coating layer excluding a specific region so as to form a first coating layer.

18. The method of claim 17, wherein the second coating layer is formed over the protective layer and the first embossing coating layers, excluding an area above the specific region.

19. The method of claim 17, wherein at least one selectable item is disposed below the specific region to function as an inputting device.

20. The method of claim 19, further comprising:
forming second embossing coating layers below the at least one selectable item.

21. The method of claim 17,
wherein the second coating material of the second coating layer is a semi-transmissive material, and
wherein the first coating material of the first coating layer is a shielding material.

22. The method of claim 17, wherein the protecting layer includes a through hole above the specific region.

23. The method of claim 16, wherein the first embossing coating layers are discretely laminated in the form of dots.

24. The mobile terminal of claim 1, further comprising:
a controller configured to control the at least one light emitting device based on at least one of detecting a sliding action to a body of the mobile terminal and an input to the key button.

* * * * *